United States Patent
Uchida et al.

(10) Patent No.: US 6,796,535 B2
(45) Date of Patent: Sep. 28, 2004

(54) FLAP OPERATING SYSTEM

(75) Inventors: Minoru Uchida, Wako (JP); Hiroshi Yamanouchi, Wako (JP); Katsutoshi Tada, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/458,320

(22) Filed: Jun. 11, 2003

(65) Prior Publication Data

US 2004/0056147 A1 Mar. 25, 2004

(30) Foreign Application Priority Data

Jun. 11, 2002 (JP) ........................................ 2002-170212

(51) Int. Cl.⁷ .............................................. B64C 13/30
(52) U.S. Cl. ...................................... 244/232; 244/233
(58) Field of Search .............................. 244/226, 76 A, 244/221, 232, 233, 228, 194, 195; 701/3, 4, 5, 14

(56) References Cited

U.S. PATENT DOCUMENTS

| | | | | |
|---|---|---|---|---|
| 2,583,405 A | * | 1/1952 | Talbot | ........................ 244/225 |
| 3,738,594 A | * | 6/1973 | Donovan et al. | ......... 244/76 R |
| 4,244,541 A | * | 1/1981 | Dorn | .......................... 244/221 |
| 4,248,395 A | * | 2/1981 | Cole | .......................... 244/216 |

FOREIGN PATENT DOCUMENTS

JP          5-97095 A       4/1993

\* cited by examiner

*Primary Examiner*—Charles T. Jordan
*Assistant Examiner*—T. Nguyen
(74) *Attorney, Agent, or Firm*—Birch, Stewart, Kolasch & Birch, LLP

(57) ABSTRACT

In a flap operating system, left and right actuators for operating left and right flaps are synchronized with each other by left and right pulleys and first and second synchronizing cables wound in an X-shape around the left and right pulleys. If one of the hydraulic actuators fall into a free failure or fails due to sticking, a difference is generated between the rotational angles of the left and right pulleys. When the difference exceeds a threshold value, the operations of the left and right actuators are stopped, whereby an excessive load is previously prevented from being applied to a main wing structure or the flap operating system.

20 Claims, 9 Drawing Sheets

FLAP OPERATING SYSTEM

CROSS-REFERENCE TO RELATED APPLICATIONS

The present nonprovisional application claims priority under 35 USC 119 to Japanese Patent Application No. 2002-170212 filed on Jun. 11, 2002 the entire contents thereof is hereby incorporated by reference.

BACKGROUND OF THE INVENTION

1. Field of the Invention

The present invention relates to a flap operating system for operating left and right flaps mounted respectively on left and right main wings synchronously with each other.

2. Description of Related Art

A conventional flap operating system is designed so that flaps mounted on left and right main wings are connected to and operated by corresponding hydraulic actuators. In order to compensate for a subtle difference between strokes of the left and right hydraulic actuators to equalize the lowered angles of the left and right flaps to each other, the left and right hydraulic actuators are connected mechanically to a synchronizing mechanism. The synchronizing mechanism comprises two cables wound in an X-shape around left and right pulleys connected to and rotated by the left and right hydraulic actuators, so that the rotational angles of the pulleys, namely, the contracted positions of hydraulic cylinders are equalized forcibly to each other.

There is a steering system adapted to operate a steering surface by a hydraulic actuator, which is known from Japanese Patent Application Laid-open No. 5-97095, wherein when the hydraulic actuator is defective, the emergent steering of the steering surface can be achieved by an electric actuator disposed in series to the hydraulic actuator.

In the conventionally known system in which the left and right hydraulic actuators for operating the left and right flaps are operatively connected to each other by the synchronizing mechanism, the following problem is encountered: When an abnormality is generated in one of the hydraulic actuators to bring it into a free state in a state in which the flaps have been lowered, aerodynamic loads acting on the left and right flaps are applied concentratedly to the other hydraulic actuator and a powder transmitting system for the other hydraulic actuator and thus, an excessive load is applied to the flap operating system or a main wing structure such as a spar and a rib. Another problem is that when the other actuator is operated in a state in which the one actuator has been stuck due to the abnormality, an excessive load is applied to the main wing structure or the flap operating system due to a load applied to the other actuator.

SUMMARY OF THE INVENTION

Accordingly, it is an object of the present invention to provide a flap operating system for operating left and right flaps synchronously with each other by left and right actuators, wherein, when a hydraulic actuators is abnormal, the excessive load is previously prevented from being applied to the main wing structure or the flap operating system.

To achieve the above object, according to a first feature of the present invention, there is provided a flap operating system for operating left and right flaps mounted on left and right main wings synchronously with each other, comprising left and right hydraulic actuators for driving the left and right flaps, respectively, left and right pulleys connected to and rotated by the left and right hydraulic actuators, and first and second synchronizing cables which connect the left and right pulleys in an X-shape to each other to synchronize the rotations of the left and right pulleys, the system further including left and right rotational angle sensors for detecting rotational angles of the left and right pulleys, respectively, and a control means adapted to calculate a difference between the rotational angles detected by the left and right rotational angle sensors and to stop the operations of the hydraulic actuators when the difference exceeds a predetermined threshold value.

With the above arrangement, in the flap operating system in which the left and right hydraulic actuators for operating the left and right flaps respectively are connected to the left and right pulleys around which the first and second synchronizing cables are wound in the X-shape, in order to synchronize the rotations of the left and right pulleys with each other, the operations of the hydraulic actuators are stopped when the difference between the rotational angles of the left and right pulleys exceeds the predetermined threshold value due to any abnormality. Therefore, it is possible to prevent an excessive load from being applied to a main wing structure or the flap operating system due to aerodynamic loads applied to the flaps or hydraulic loads generated by the hydraulic actuators. Thus, it is unnecessary to enhance the rigidity of the various components to a level more than required in consideration of the excessive load. This can contribute to a reduction in weight of a main wing and a reduction in cost.

According to a second feature of the present invention, in addition to the first feature, each of the pulleys includes a pulley body, an oscillation arm pivotally supported at its intermediate portion for oscillation relative to the pulley body, and a locking member adapted to lock the oscillation arm at a predetermined location relative to the pulley body and to permit the oscillation of the oscillation arm relative to the pulley body when a load applied to the oscillation arm exceeds a predetermined value; the first synchronizing cable connects one end of the oscillation arm of the left pulley and the other end of the oscillation arm of the right pulley to each other; and the second synchronizing cable connects one end of the oscillation arm of the right pulley and the other end of the oscillation arm of the left pulley to each other, whereby when the oscillation arm is oscillated relative to the pulley body of one of the left and right pulleys, the difference between the rotational angles detected by the left and right rotational angle sensors exceeds the threshold value.

With the above arrangement, the pulley is comprised of the pulley body and the oscillation arm pivotally supported for oscillation relative to the pulley body, and the oscillation arm is locked at the predetermined location relative to the pulley body by the locking member, so that the oscillation of the oscillation arm relative to the pulley body is permitted when the load applied from the first synchronizing cable or the second synchronizing cable to the oscillation arm exceeds the predetermined value. Therefore, when the tension of any one of the first and second synchronizing cables is increased due to an abnormality, the oscillation arm is oscillated relative to the pulley body of one of the pulleys, whereby a difference can be generated between the rotational angles of the left and right pulleys.

Resolvers 41 and 42 in each of embodiments correspond to the rotational angle sensors of the present invention, and an electronic control unit U in each of the embodiments corresponds to the control means of the present invention.

The above and other objects, features and advantages of the invention will become apparent from the following description of the preferred embodiments taken in conjunction with the accompanying drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

The present invention will now be described by way of preferred embodiments with reference to the accompanying drawings.

Figure 1:
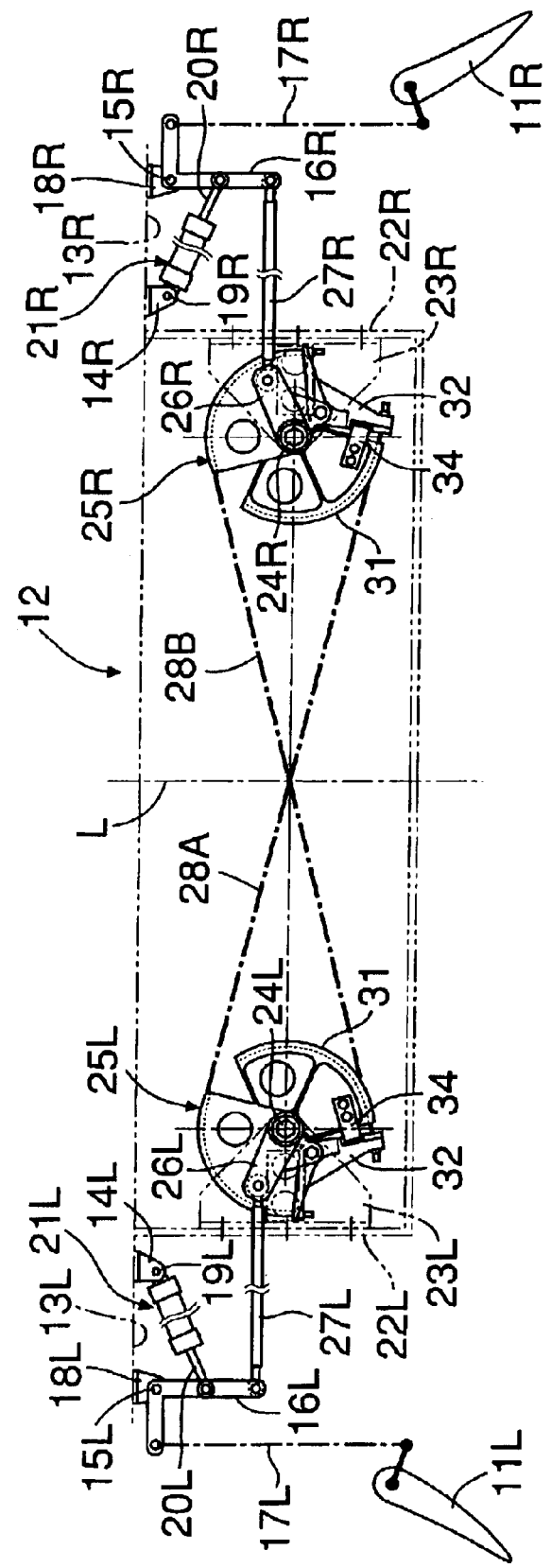
FIG. 1 is a plan view of the entire arrangement of a flap operating system.
Figure 2:
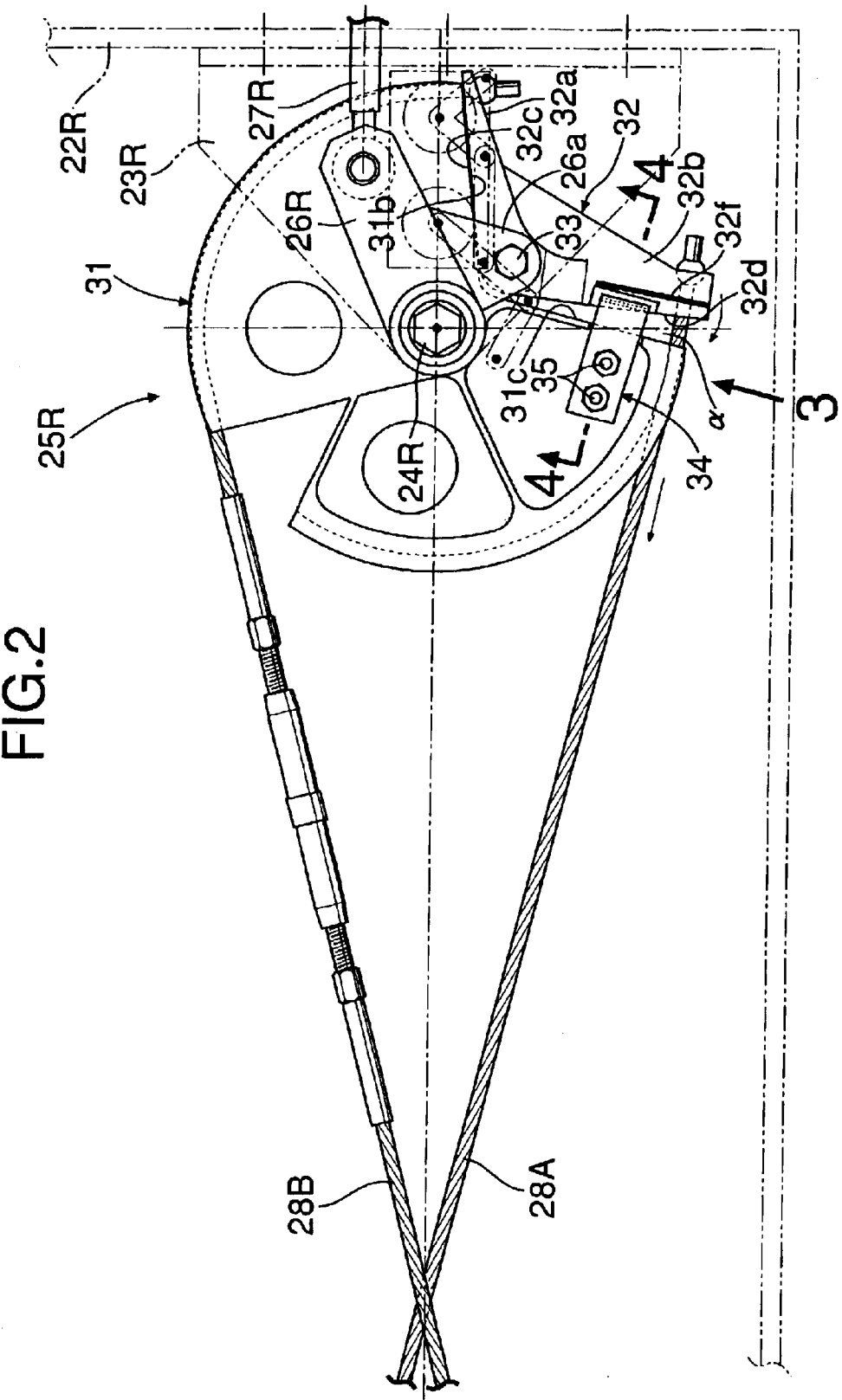
FIG. 2 is an enlarged view of essential portions of FIG. 1.
Figure 3:
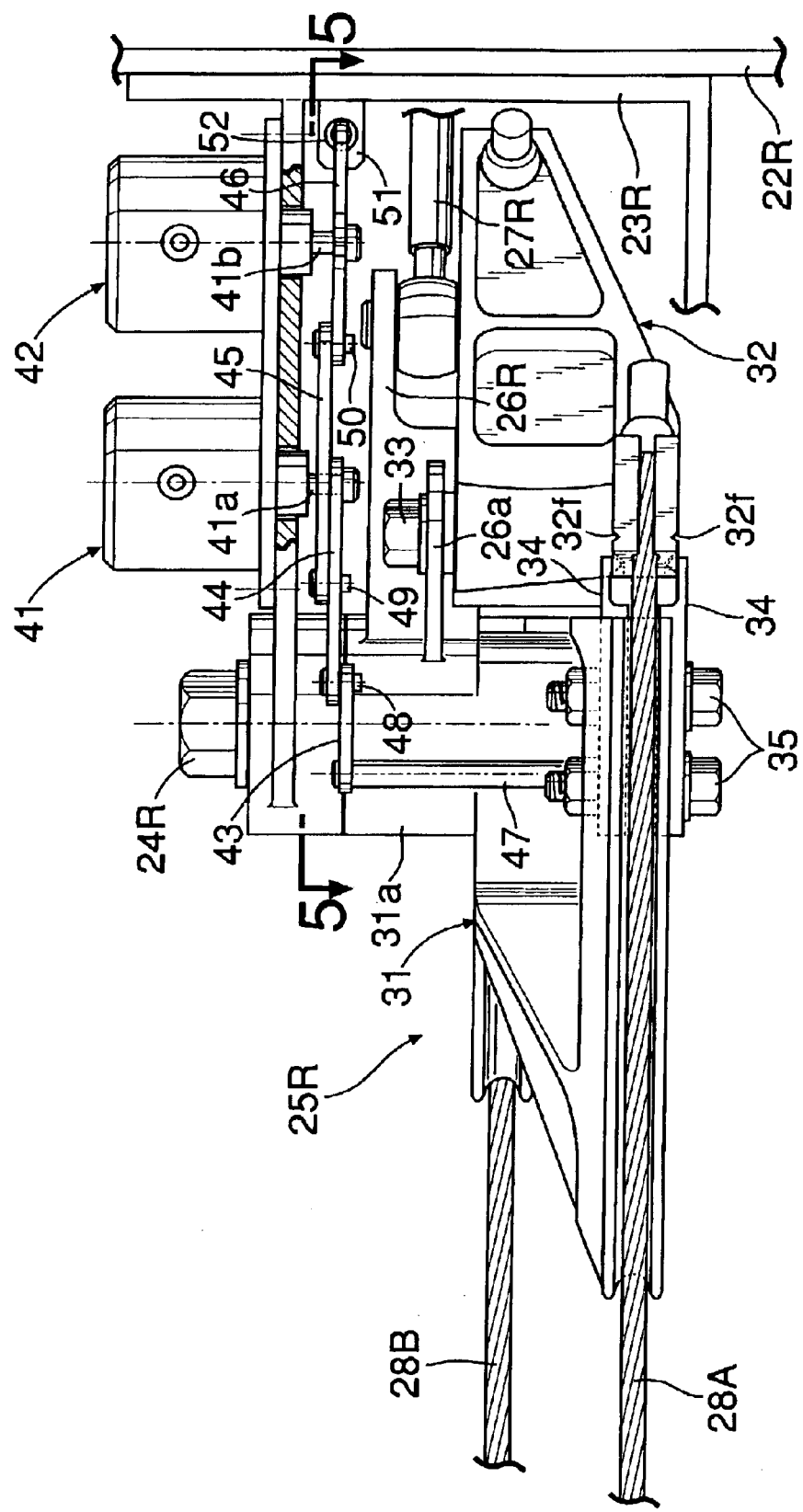
FIG. 3 is a view taken in a direction of an arrow 3 in FIG. 2.

Referring first to FIG. 1 showing a first embodiment of the present invention, a flap operating system 12 for operating left and right flaps 11L and 11R vertically movably mounted at trailing edges of left and right main wings synchronously with each other includes bell-cranks 16L and 16R pivotally supported on brackets 14L and 14R mounted to main wing structures (e.g., rear spars 13L and 13R) through pivot pins 15L and 15R, links 17L and 17R for connecting tip ends of ones of arms of the bell-cranks 16L and 16R to the flaps 11L and 11R, and hydraulic actuators 21L and 21R which are pivotally supported on brackets 18L and 18R mounted on the rear spars 13L and 13R through pivot pins 19L and 19R, with their output rods 20L and 20R connected to intermediate portions of the other arms of the bell-cranks 16L and 16R.

Therefore, when the left hydraulic actuator 21L is driven in a contracted manner, the bell-crank 16L is rotated in a counterclockwise direction to push the link 17L rearwards, whereby the flap 11L is lowered. On the other hand, when the hydraulic actuator 21L is driven in an expanded manner, the flap 11L is lifted. Likewise, when the right hydraulic actuator 21R is driven in a contracted manner, the bell-crank 16R is rotated in a clockwise direction to push the link 17R rearwards, whereby the flap 11R is lowered. On the other hand, when the hydraulic actuator 21R is driven in an expanded manner, the flap 11R is lifted.

In order to absorb a subtle difference between strokes of the left and right hydraulic actuators 21L and 21R to equalize the angles of the left and right flaps 11L and 11R to each other, pulleys 25L and 25R are pivotally supported on brackets 23L and 23R mounted on main wing structures (e.g., ribs 22L and 22R) through support shafts 24L and 24R, respectively. Links 27L and 27R extending through the ribs 22L and 22R are pivotally supported at their opposite ends on tip ends of link arms 26L and 26R rotated in unison with the pulleys 25L and 25R and on tip ends of the other arms of the bell-cranks 16L and 16R. The left and right pulleys 25L and 25R are connected in an X-shape to each other by a first synchronizing cable 28A and a second synchronizing cable 28B.

For example, when the left and right hydraulic actuators 21L and 21R are driven in the contracted manner, the left pulley 25L is rotated in a clockwise direction and the right pulley 25R is rotated in a counterclockwise direction through the links 27L and 27R. At this time, the subtle difference between strokes of the left and right hydraulic actuators 21L and 21R can be absorbed to equalize the angles of the left and right flaps 11L and 11R to each other, because the left and right pulleys 25L and 25R are connected in an X-shape to each other by the first and second synchronizing cables 28A and 28B and rotated through the same angle in opposite directions.

The structures of the left and right pulleys 25L and 25R will be described below with reference to FIGS. 2 to 6. The structure of the right pulley 25R will be representatively described, because the structures of the left and right pulleys 25L and 25R are symmetric with each other with respect to a center line L in the system.

The pulley 25R includes a pulley body 31 having a center angle of about 120°, and the link arm 26R is integrally formed on a boss 31a protruding upwards at the center of the pulley body 31. The boss 31a of the pulley body 31 is pivotally supported for rotation by a support shaft 24R extending vertically through the bracket 23R mounted on the rib 22R. An L-shaped oscillation arm 32 is pivotally supported at its intermediate portion on a stay 26a projectingly and integrally provided on a side of the link arm 26R. The oscillation arm 32 includes a first arm portion 32a and a second arm portion 32b extending radially outwards about a pin 33. A side face 32c of the first arm portion 32a is in abutment against one of end faces 31b of the pulley body 31, and a side 32d of the second arm portion 32b is spaced apart from the other end face 31c of the pulley body 31 with a gap α (see FIG. 2) left therebetween.

A pair of locking members 34, 34 are fastened together by two bolts 35, 35 to upper and lower surfaces of the pulley body 31, which are opposed to the second arm portion 32b of the oscillation arm 32 through the gap α. Each of the locking members 34 is provided at its tip end with a resiliently deformable thinner portion 34a and a locking claw 34b connected to the thinner portion 34a and having a V-shaped section. A pair of upper and lower inclined faces 32e, 32e and a pair of upper and lower locking grooves each 32f, 32f having a V-shaped section are provided in the second arm portion 32b of the oscillation arm 32 in corresponding to the thinner portions 34a, 34a and the locking claws 34b, 34b. In a normal state, the locking claws 34b, 34b of the locking members 34, 34 are in abutment against the inclined faces 32e, 32e of the second arm portion 32b.

As can be seen from FIG. 1, a left end of the first synchronizing cable 28A is wound around the left pulley body 31 and then fixed to the tip end of the first arm portion 32a of the left oscillation arm 32, and a right end of the first synchronizing cable 28A is wound around the right pulley body 31 and then fixed to the tip end of the second arm portion 32b of the right oscillation arm 32. On the other hand, a right end of the second synchronizing cable 28B is wound around the right pulley body 31 and then fixed to the tip end of the first arm portion 32a of the right oscillation arm 32, and a left end of the second synchronizing cable 28B is wound around the left pulley body 31 and then fixed to the tip end of the second arm portion 32b of the left oscillation arm 32. The left and right pulleys 25L and 25R are rotated synchronously with each other in opposite directions through the same angle by the first and second synchronizing cables 28A and 28B.

A pair of resolvers 41 and 42 are mounted on an upper surface of the bracket 23R fixed to the rib 22R. A second link 44 is fixed at one end thereof to a detection shaft 41a of the resolver 41 extending downwards through the bracket 23R, and a fourth link 46 is fixed at its intermediate portion to a detection shaft 42a of the resolver 42 extending downwards through the bracket 23R. A first link 43 is pivotally supported at one end thereof on an upper end of a support pillar 47 embedded in an upper surface of the pulley body 31, and is pivotally supported at the other end thereof on the other end of the second link 44 by a pin. A third link 45 is pivotally supported at its opposite ends on an intermediate portion of the second link 44 and one end of the fourth link 46 by pins 49 and 50, respectively. A tension spring 52 is disposed between the other end of the fourth link 46 and a spring mount 51 mounted on the bracket 23R.

Figure 5:
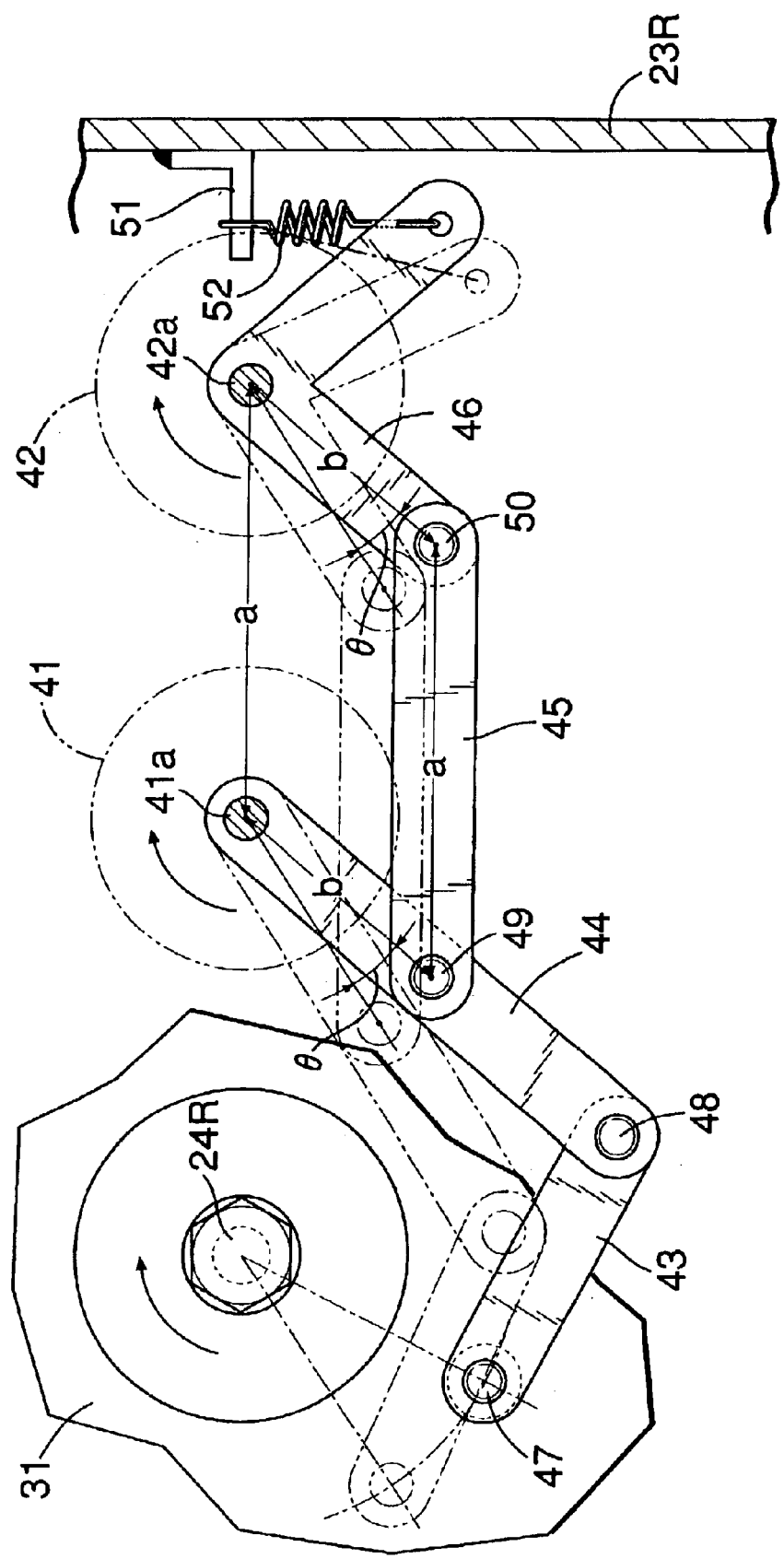
FIG. 5 is an enlarged sectional view taken along a line 5—5 in FIG. 3.
Figure 6:
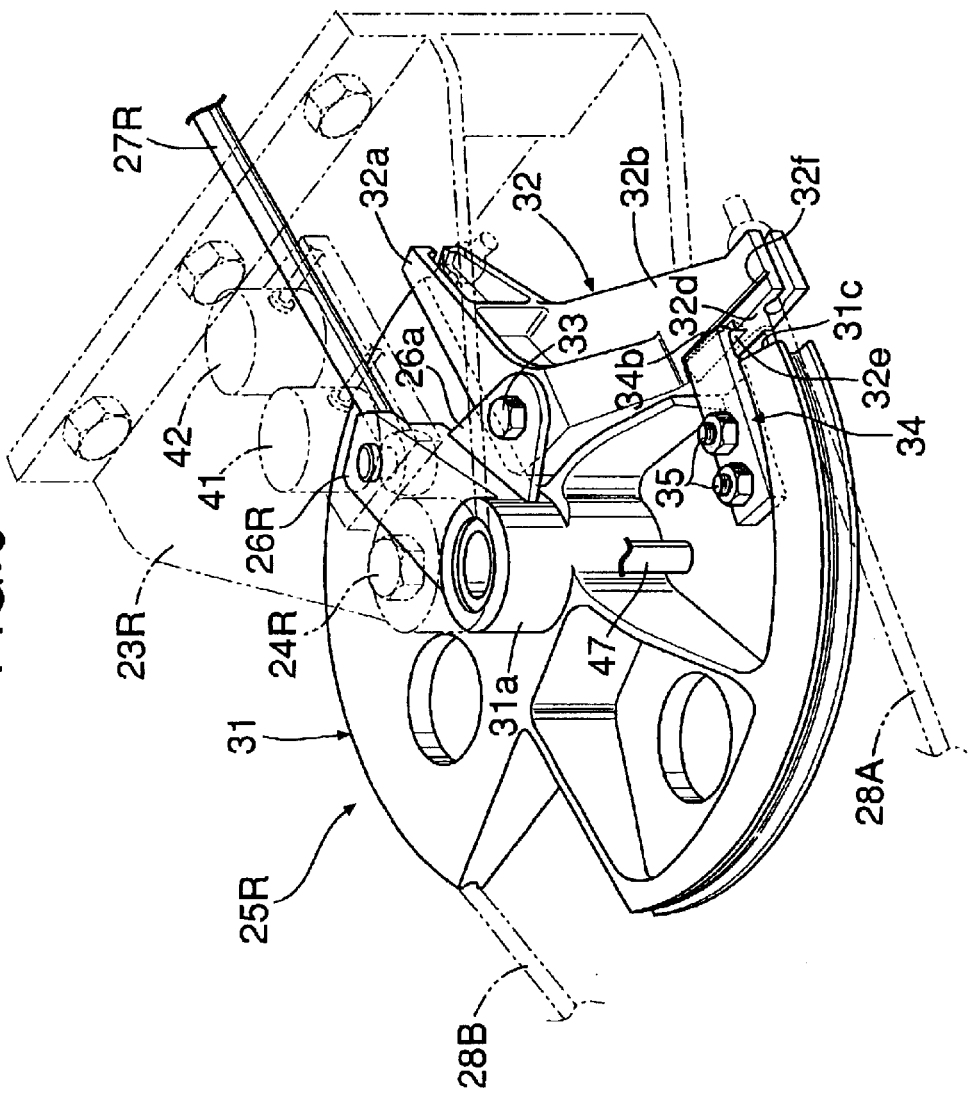
FIG. 6 is a perspective view of a right pulley.

For example, when the pulley body 31 is rotated in a direction indicated by an arrow in FIG. 5, the first to fourth links 43 to 46 are moved from positions indicated by solid lines to positions indicated by dashed lines in operative association with the support pillar 47 embedded in the pulley body 31, and the detection shafts 41a and 41b of the resolvers 41 and 42 are rotated. At this time, the second link 44, the third link 45 and the fourth link 46 form a parallel quadric link mechanism, because a distance a between the detection shafts 41a and 42a of the resolvers 41 and 42 and a distance a between the pins 49 and 50 are set to be equal to each other, and a distance b between the detection shaft 42a of the resolver 41 and the pin 49 and a distance b between the detection shaft 42a of the resolver 42 and the pin 50 are set to be equal to each other. Therefore, rotational angles θ of the detection shafts 41a and 42a of the resolvers 41 and 42 are equal to each other. The two resolvers 41 and 42 are mounted for the purpose of a fail-safe in case one of them is fallen into a failure. When the two resolvers 41 and 42 are normal, for example, an average value of outputs from the two resolvers 41 and 42 is used.

The operation of the embodiment having the above-described arrangement will be described below.

When the hydraulic actuators 21L and 21R are driven in the contracted manner, the link 17L and 17R are pushed rearwards to lower the left and right flaps 11L and 11R. At this time, the movements of the left and right hydraulic actuators 21L and 21R are transmitted through the links 27L and 27R, whereby the left pulley 25L is rotated in the clockwise direction and the right pulley 25R is rotated in the counterclockwise direction, as described above. The rotational angles of the left and right pulleys 25L and 25R connected to each other by the first and second synchronizing cables 28A and 28B are forcibly equalized to each other, whereby the subtle difference between the strokes of the left and right hydraulic actuators 21L and 21R can be absorbed to equalize the angles of the left and right flaps 11L and 11R to each other.

Aerodynamic forces applied to the lowered flaps 11L and 11R result in that loads in expanding direction are applied to the hydraulic actuators 21L and 21R, but the flaps 11L and 11R are maintained in the above-described lowered positions by thrust forces generated by the hydraulic actuators 21L and 21R and opposing the aerodynamic forces.

Now, it is supposed that an abnormality such as the leakage of oil has occurred, for example, in a hydraulic circuit for the left hydraulic actuator 21L, whereby the hydraulic actuator 21L has fallen into a free state in which it generates no thrust force. In this case, the left hydraulic actuator 21L cannot support the aerodynamic force applied to the left flap 11L and hence, the left bell-crank 16L is rotated in the clockwise direction by the aerodynamic force applied by the left flap 11L to move the left link L leftwards, whereby the left pulley 25L is rotated in the counterclockwise direction to pull the first synchronizing cable 28A leftwards. At this time, the rotation of the pulley body 31 of the right pulley 25R connected to the normal right hydraulic actuator 21R is restrained, but the oscillation arm 32 of the right pulley 25R connected to the first synchronizing cable 28A is biased in the clockwise direction about the pin 33.

As a result, the pair of locking members 34, 34 mounted on the pulley body 31 of the right pulley 25R are resiliently deformed so that they are opened relative to each other, and the locking claws 34b, 34b, which are hitherto in abutment against the inclined faces 32e, 32e of the second arm portion 32b of the oscillation arm 32, are moved to ride on the second arm 32b and brought into engagement in the locking grooves 32f, 32f. When the locking members 34, 34 have ridden on the second arm portion 32b and are brought into engagement in the locking grooves 32f, 32f in this manner, the oscillation arm 32 is rotated in the clockwise direction relative to the pulley body 31, whereby the end face 31c of the pulley body 31 and the side 32d of the oscillation arm 32, which has been hitherto spaced apart from each other with the gap α left therebetween, are brought into close contact with each other, and the end face 31b of the pulley body 31 and the side face 32c of the oscillation arm 32 are moved away from each other (see FIGS. 2 and 7).

When the oscillation arm 32 is rotated in the clockwise direction relative to the pulley body 31 of the right pulley 25R, as described above, the first synchronizing cable 28A connected to the second arm portion 32b of the oscillation arm 32 is loosened and hence, the left pulley 25L, to which the aerodynamic load of the left flap 11 is transmitted, is rotated in the counterclockwise direction by an amount corresponding to the loosening of the first synchronizing cable 28A. At this time, the rotation of the right pulley 25R is restrained by the right hydraulic actuator, and hence the rotational angles of the left and right pulleys 25L and 25R are not equal to each other.

Figure 8:
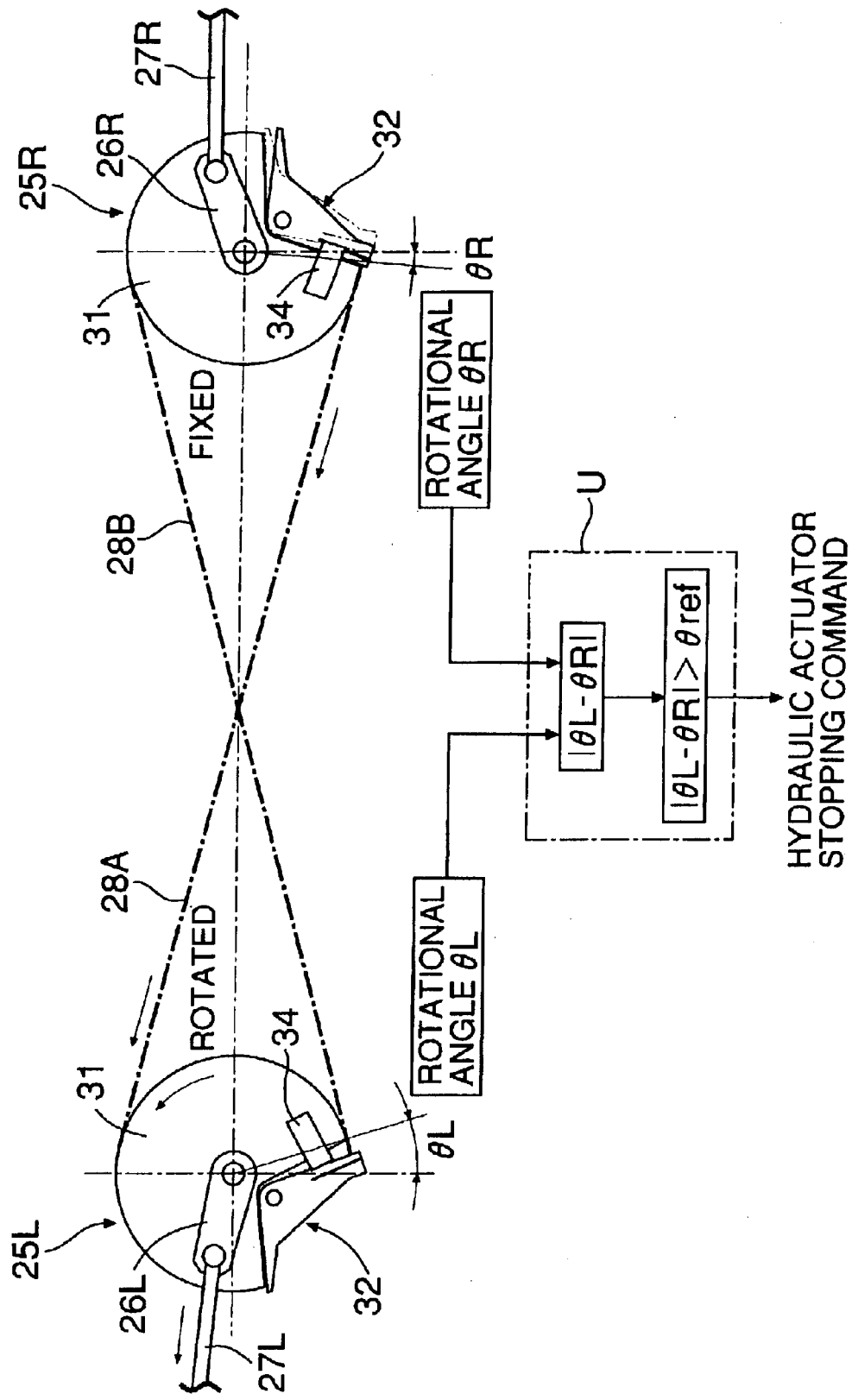
FIG. 8 is a diagram for explaining the operation when there is an abnormality.

More specifically, as shown in FIG. 8, when an absolute value |θL−θR| of a difference between a rotational angle θL of the left pulley 25L detected by the left resolvers 41 and 42 and a rotational angle θR of the right pulley 25R detected by the right resolvers 41 and 42, exceeds a threshold value θref (when |θL−θR|>θref), an electronic control unit U determines that an abnormality has occurred, thereby stopping the operations of the left and right hydraulic actuators 21L and 21R.

If the electronic control unit U did not stop the operation of the left and right actuators 21L and 21R, the aerodynamic loads of the left and right flaps 11L and 11R would not be applied concentratedly to the left bell-crank 16L, the left hydraulic actuator 21L, the rear spar 13L to which the left bell-crank 16L and the left hydraulic actuator 21L are mounted, the left pulley 25L, the rib 22L on which the left pulley 25L is mounted, and the like, causing a necessity to set their rigidities at sufficiently high levels, resulting in increases in weight and cost.

Figure 4:
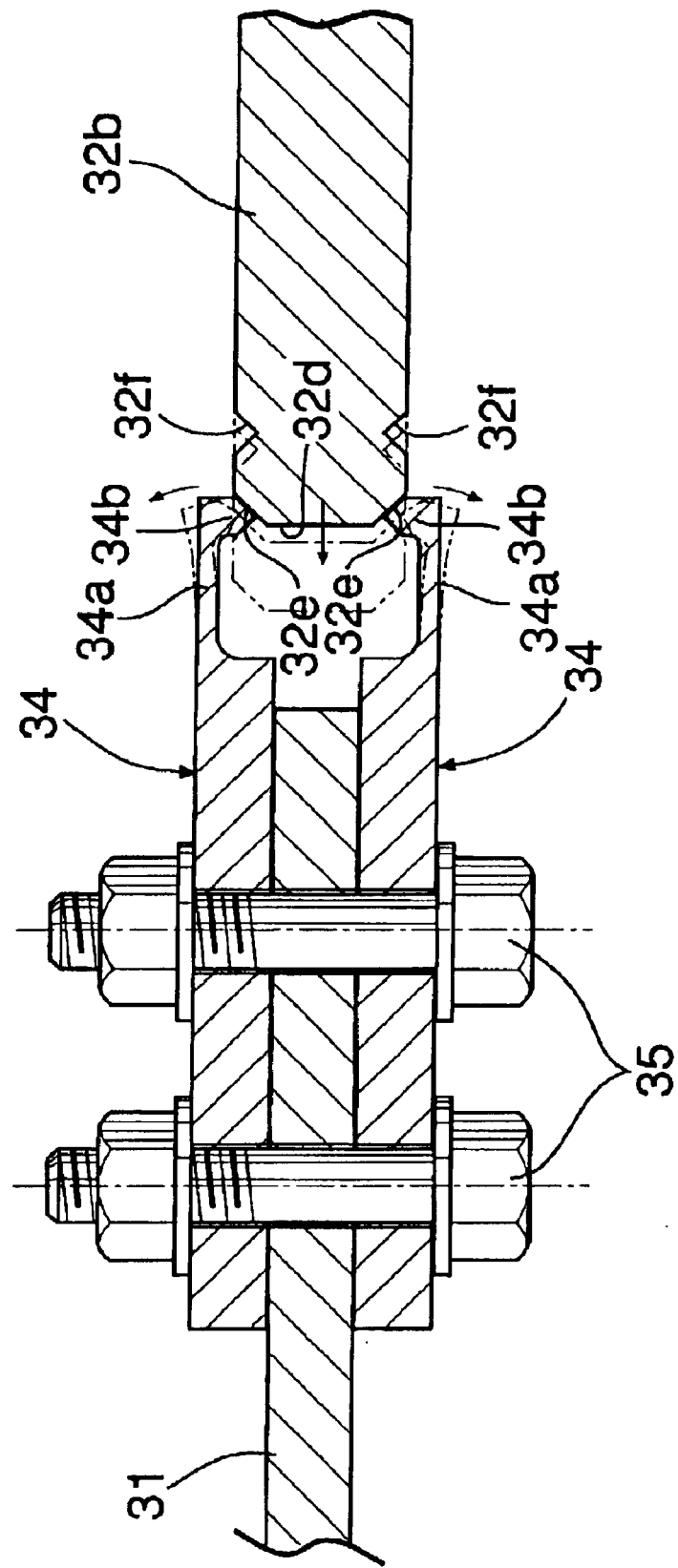
FIG. 4 is an enlarged sectional view taken along a line 4—4 in FIG. 2.
Figure 7:
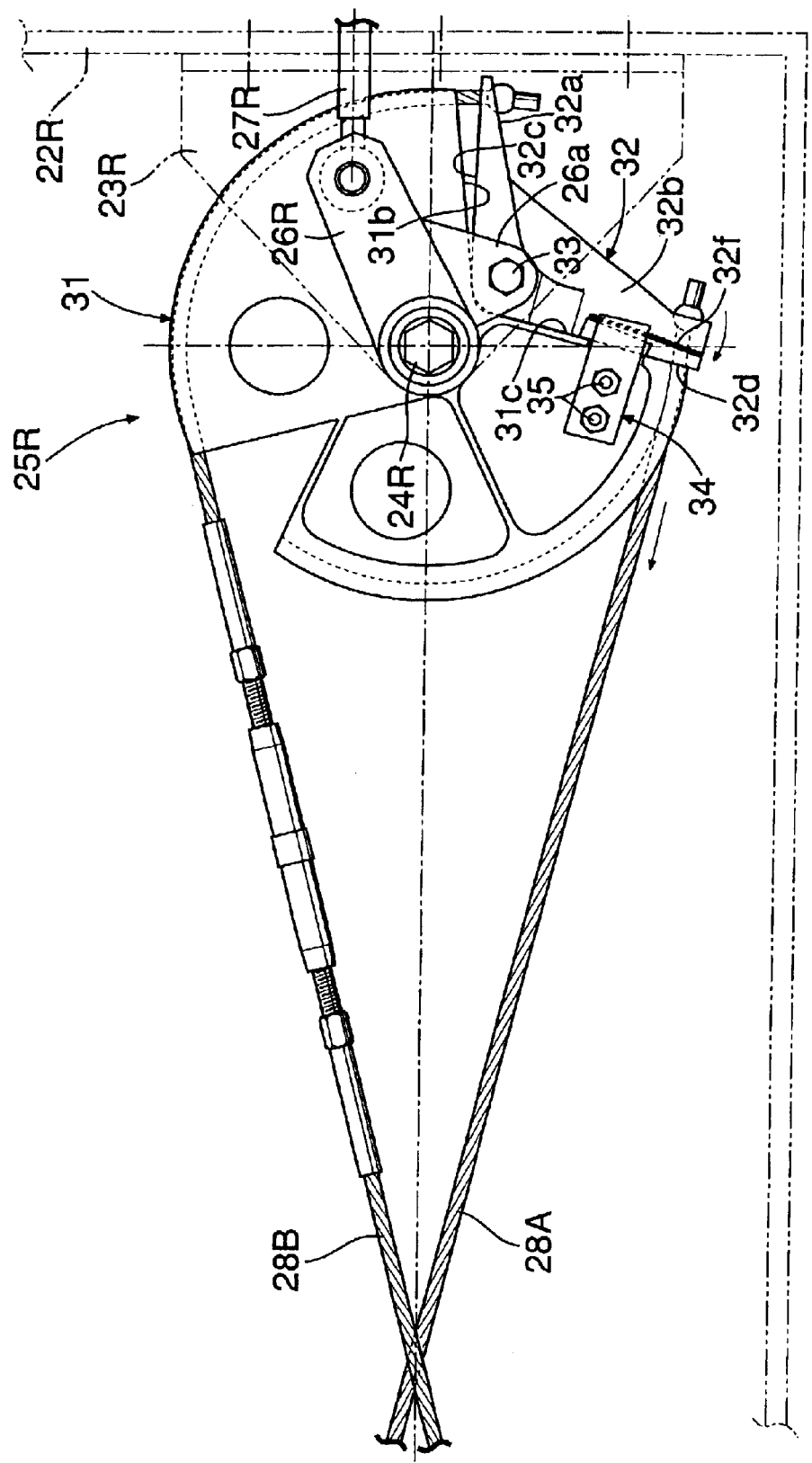
FIG. 7 is a view similar to FIG. 2 but for explaining the operation (a state in which the operation has been completed)

For example, if the left hydraulic actuator 21L falls into a stuck state due to an abnormality (a trouble such as a mechanical locking) in a state in which the left and right flaps 11L and 11R have been housed, the rotation of the left pulley 25L connected to the left hydraulic actuator 21L is restrained. When the normal right hydraulic actuator 21R is driven in the contracted manner in order to lower the flaps 11L and 11R from this state, the right pulley 25R intends to rotate in the counterclockwise direction. However, because the rotation of the left pulley 25L is restrained by the hydraulic actuator 21L which is in the stuck state, the tension of the first synchronizing cable 28A is increased abnormally, whereby the oscillation arm 32 of the right pulley 25R is rotated in the clockwise direction relative to the pulley body 31, and the locking members 34, 34 are moved onto the second arm portion 32b and brought into engagement in the locking grooves 32f, 32f, as shown in FIGS. 4 and 7.

Even in this case, the absolute value $|\theta L-\theta R|$ of the difference between the rotational angle $\theta L$ of the left pulley 25L detected by the left resolvers 41 and 42 and the rotational angle $\theta R$ of the right pulley 25R detected by the right resolvers 41 and 42, exceeds the threshold value $\theta ref$, and hence, the electronic control unit U determines that the abnormality has been generated, thereby stopping the operation of the left and right hydraulic actuators 21L and 21R. Thus, it is possible to prevent the driving force from the normal right hydraulic actuator 21R from being transmitted to the left flap 11L to which the left hydraulic actuator 21L has been stuck, and to prevent an excessive load from being applied to the main wing structure and the flap operating system 12.

Figure 9:
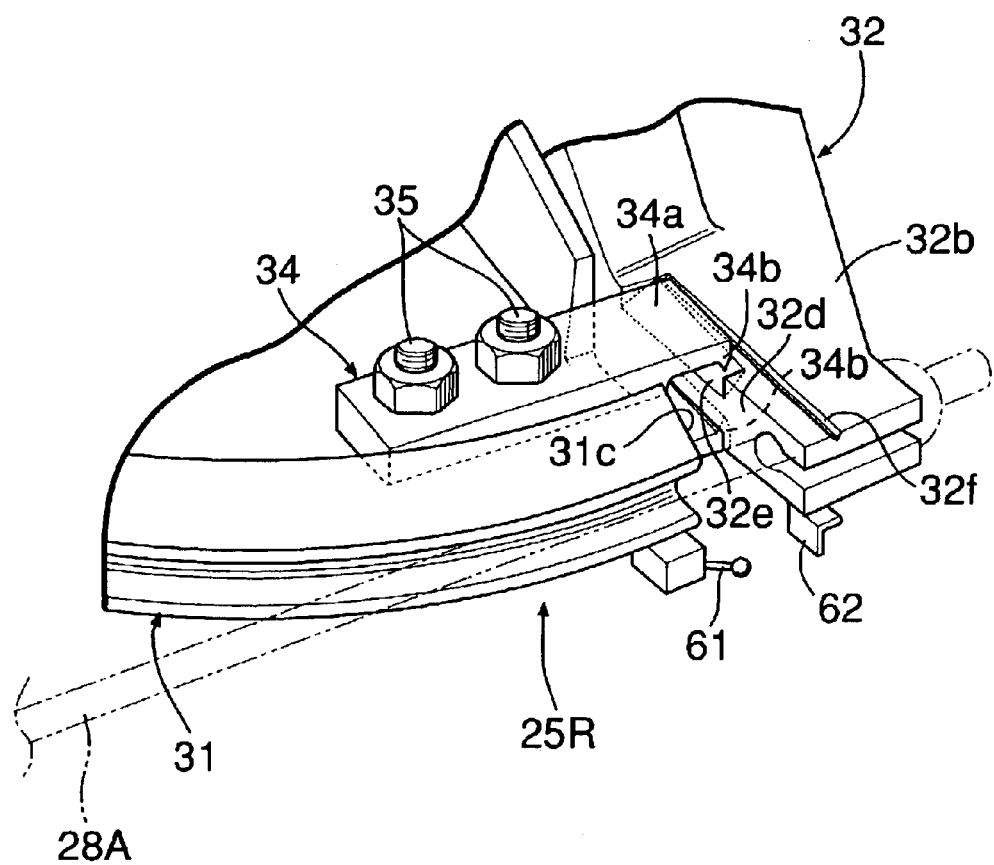
FIG. 9 is a view of essential portions similar to those in FIG. 2 but according to a second embodiment of the present invention.

A second embodiment of the present invention will now be described with reference to FIG. 9.

In the first embodiment, it is detected using the resolvers 41 and 42 that the oscillation arm 32 has been oscillated relative to the pulley bodies 31 of the pulleys 25L and 25R, but in the second embodiment, on the supposition that the resolvers 41 and 42 have been fallen into a failure, a limit switch 61 and a dog 62 are mounted on the pulley body 31 and the oscillation arm 32, respectively, so that when the oscillation arm 32 has been oscillated relative to the pulley body 31 due to an abnormality in the hydraulic actuators 21L and 21R, the dog 62 kicks the limit switch 61. Therefore, it is possible to determine that the absolute value $|\theta L-\theta R|$ of the difference between the rotational angle $\theta L$ of the left pulley 25L and the rotational angle $\theta R$ of the right pulley 25R has exceeded the threshold value $\theta ref$, by turning one of the left and right limit switches 61 on.

Although the embodiments of the present invention have been described in detail, it will be understood that the present invention is not limited to the above-described embodiments, and various modifications in design may be made without departing from the spirit and scope of the invention defined in the claims.

For example, the structure of the link system connecting the hydraulic actuators 21L and 21R to the flaps 11L and 11R as well as to the pulleys 25L and 25R is not limited to that in each of the embodiments and may be modified properly.

What is claimed is:

1. A flap operating system for operating left and right flaps mounted on left and right main wings synchronously with each other, comprising:
   left and right hydraulic actuators for driving the left and right flaps, respectively,
   left and right pulleys connected to and rotated by said left and right hydraulic actuators, and
   first and second synchronizing cables for connecting said left and right pulleys in an X-shape to each other to synchronize the rotations of said left and right pulleys, said system further including:
      left and right rotational angle sensors for detecting rotational angles of said left and right pulleys, respectively, and
      control means for calculating a difference between the rotational angles detected by said left and right rotational angle sensors and to stop the operations of said hydraulic actuators when said difference exceeds a predetermined threshold value.

2. The flap operating system according to claim 1, wherein said left and right pulleys each includes a pulley body, an oscillation arm pivotally supported at its intermediate portion for oscillation relative to said pulley body, and a locking member adapted to lock said oscillation arm at a predetermined location relative to said pulley body and to permit the oscillation of said oscillation arm relative to said pulley body when a load applied to said oscillation arm exceeds a predetermined value; said first synchronizing cable connects one end of said oscillation arm of said left pulley and the other end of said oscillation arm of said right pulley to each other; and said second synchronizing cable connects one end of said oscillation arm of said right pulley and the other end of said oscillation arm of said left pulley to each other, whereby when said oscillation arm is oscillated relative to said pulley body of one of said left and right pulleys, the difference between the rotational angles detected by said left and right rotational angle sensors exceeds the threshold value.

3. The flap operating system according to claim 2, wherein said locking member includes at least one locking member having a proximal end mounted on said left pulley and a distal end extending therefrom, said distal end including a locking claw for selective engagement with a locking groove disposed on said oscillation arm for retaining said left pulley relative to said oscillation arm.

4. The flap operating system according to claim 3, wherein said locking member includes at least two locking members having proximal ends mounted on said left pulley and distal ends extending therefrom, said distal ends including locking claws for selective engagement with locking grooves disposed on said oscillation arm for retaining said left pulley relative to said oscillation arm.

5. The flap operating system according to claim 4, wherein said distal ends of said locking members are resiliently deformed for opening relative to each other prior to engagement with said locking grooves.

6. The flap operating system according to claim 4, wherein when said locking claws are engaged with said locking grooves, the left pulley and the oscillation arm are in close contact with each other and said second synchronizing cable is loosened and wherein said left rotational angle sensor transmits a signal to said control means.

7. The flap operating system according to claim 4, and further including a limit switch operatively connected to at least one of said left pulley and said oscillation arm for generating a signal when said left pulley engages said oscillation arm that is transmitted to said control means.

8. The flap operating system according to claim 2, and further including a first link including a proximal end operatively connected to said left pulley and a distal end extending therefrom, a second link including a first end connected to said distal end of the first link and a second end operatively connected to said left rotational angle sensor, a third link having a first end connected to approximately a mid-portion of said second link and a second end extending therefrom, a fourth link having a first end connected to the second end of the third link and a second end connected to the left rotational angle sensor for transmitting angular change in said left pulley and said oscillation arm to said left rotational angle sensor.

9. The flap operating system according to claim 2, wherein said locking member includes at least one locking member having a proximal end mounted on said right pulley and a distal end extending therefrom, said distal end including a locking claw for selective engagement with a locking groove disposed on said oscillation arm for retaining said right pulley relative to said oscillation arm.

10. The flap operating system according to claim 9, wherein said locking member includes at least two locking members having proximal ends mounted on said right pulley body and distal ends extending therefrom, said distal ends including locking claws for selective engagement with locking grooves disposed on said oscillation arm for retaining said right pulley relative to said oscillation arm.

11. The flap operating system according to claim 10, wherein said distal ends of said locking members are resiliently deformed for opening relative to each other prior to engagement with said locking grooves.

12. The flap operating system according to claim 10, wherein when said locking claws are engaged with said locking grooves, the right pulley and the oscillation arm are in close contact with each other and said first synchronizing cable is loosened and wherein said right rotational angle sensor transmits a signal to said control means.

13. The flap operating system according to claim 10, and further including a limit switch operatively connected to at least one of said right pulley and said oscillation arm for generating a signal when said right pulley engages said oscillation arm that is transmitted to said control means.

14. The flap operating system according to claim 2, and further including a fist link including a proximal end operatively connected to said right pulley and a distal end extending therefrom, a second link including a first end connected to said distal end of the first link and a second end operatively connected to said right rotational angle sensor, a third link having a first end connected to approximately a mid-portion of said second link and a second end extending therefrom, a fourth link having a first end connected to the second end of the third link and a second end connected to the left rotational angle sensor for transmitting angular change in said right pulley and said oscillation arm to said right rotational angle sensor.

15. An operating system adapted to be used for operating left and right flaps mounted on left and right main wings synchronously with each other, comprising:

left and right hydraulic actuators adapted for driving left and right flaps, respectively, left and right pulleys connected to and rotated by said left and right hydraulic actuators, and first and second synchronizing cables for connecting said left and right pulleys to each other for synchronizing the rotations of said left and right pulleys, said system further including:

left and right rotational angle sensors for detecting rotational angles of said left and right pulleys, respectively, and control means adapted for calculating a difference between the rotational angles detected by said left and right rotational angle sensors and to stop the operations of said hydraulic actuators when said difference exceeds a predetermined threshold value.

16. The operating system according to claim 15, wherein said left and right pulleys each includes a pulley body, an oscillation arm pivotally supported at its intermediate portion for oscillation relative to said pulley body, and a locking member adapted to lock said oscillation arm at a predetermined location relative to said pulley body and to permit the oscillation of said oscillation arm relative to said pulley body when a load applied to said oscillation arm exceeds a predetermined value; said first synchronizing cable connects one end of said oscillation arm of said left pulley and the other end of said oscillation arm of said right pulley to each other; and said second synchronizing cable connects one end of said oscillation arm of said right pulley and the other end of said oscillation arm of said left pulley to each other, whereby when said oscillation arm is oscillated relative to said pulley body of one of said left and right pulleys, the difference between the rotational angles detected by said left and right rotational angle sensors exceeds the threshold value.

17. The operating system according to claim 16, wherein said locking member includes at least one locking member having a proximal end mounted on said left pulley and a distal end extending therefrom, said distal end including a locking claw for selective engagement with a locking groove disposed on said oscillation arm for retaining said left pulley relative to said oscillation arm.

18. The operating system according to claim 17, wherein said locking member includes at least two locking members having proximal ends mounted on said left pulley and distal ends extending therefrom, said distal ends including locking claws for selective engagement with locking grooves disposed on said oscillation arm for retaining said pulley body relative to said oscillation arm.

19. The operating system according to claim 18, wherein said distal ends of said locking members are resiliently deformed for opening relative to each other prior to engagement with said locking grooves.

20. The operating system according to claim 18, wherein when said locking claws are engaged with said locking grooves, the left pulley and the oscillation arm are in close contact with each other and said second synchronizing cable is loosened and wherein said left rotational angle sensor transmits a signal to said control means.

* * * * *